United States Patent
Huang et al.

(10) Patent No.: US 7,107,171 B2
(45) Date of Patent: Sep. 12, 2006

(54) PRODUCTION PROCEDURE WITH PCB CALIBRATION

(75) Inventors: Yaote Huang, Taipei (TW); Pi-Cheng Chiang, Taipei (TW)

(73) Assignee: Lite-On It Corporation, Taipei (TW)

( * ) Notice: Subject to any disclaimer, the term of this patent is extended or adjusted under 35 U.S.C. 154(b) by 175 days.

(21) Appl. No.: 10/710,507

(22) Filed: Jul. 16, 2004

(65) Prior Publication Data
US 2006/0015281 A1 Jan. 19, 2006

(51) Int. Cl.
*G06F 19/00* (2006.01)
(52) U.S. Cl. ...................... 702/117; 702/108
(58) Field of Classification Search ............ 702/35, 702/40, 82, 108, 116, 117, 182, 185; 360/266.7; 369/47.36, 47.49, 53.1, 215.1, 220; 700/116, 700/231; 250/345, 347; 714/769
See application file for complete search history.

(56) References Cited
U.S. PATENT DOCUMENTS

| | | | |
|---|---|---|---|
| 5,812,564 A | * | 9/1998 | Bonke et al. ............... 714/769 |
| 2002/0135913 A1 | * | 9/2002 | Yanagimoto ................. 360/31 |
| 2003/0099177 A1 | * | 5/2003 | Wang et al. ............. 369/53.26 |

* cited by examiner

*Primary Examiner*—Bryan Bui
(74) *Attorney, Agent, or Firm*—Winston Hsu

(57) ABSTRACT

A method for testing an optical disc drive control PCB using a test jig featuring a reference optical pick-up head. The method includes steps for measuring an output of the reference optical pick-up head (OPU) laser, comparison of the OPU output to the output of an optical disc drive control PCB under test and, for comparing the measured value to a predetermined range of values and accordingly determining whether the optical disc drive control PCB under test is acceptable.

15 Claims, 7 Drawing Sheets

PRODUCTION PROCEDURE WITH PCB CALIBRATION

BACKGROUND OF INVENTION

1. Field of the Invention

The invention relates to a test system for the post-production testing of an optical pick-up head control PCB for an optical disc drive.

2. Description of the Prior Art

Optical disc drives, of one form or another, have been considered standard equipment for personal computers for several years. Generally speaking, optical disc drives are used to read information stored on an optical disc. Examples of optical disc drives are known as compact disc drives (CD-ROM drives) and digital versatile disc drives (DVD-ROM drives) in the prior art. Some optical disc drives have the additional capability of being able to rewrite data onto an optical disc, for example CD-RW and DVD-RW drives. Optical disc drives are used in the playback and writing of many varieties of digital media including music, video, images, data archives, software and games.

FIG. 1 is a perspective view of a typical optical disc drive unit with ancillary components removed for clarity. Production of an optical disc drive 10 involves high precision manufacture, assembly and testing of at least the sub-modules detailed below:

- 11 An optical disc transport or traverse (TVS) assembly.
- 111 An optical pick-up head (OPU).
- 112 A spindle assembly.
- 113 A translation mechanism.
- 12 A disc loading mechanism.
- 13 A control printed circuit board (PCB).
- 14 A chassis.

Careful consideration must be given to matching certain sub-modules during assembly, for example, the performance of the TVS assembly 11 will depend heavily upon that of the control PCB 13, not least because it is responsible for the interface processing for the optical pick-up head. Optical pick-up heads utilize coherent light to read information from, and in some cases also to write information to, an optical disc. The coherent light source generally takes the form of a semiconductor laser diode, the power output of which must be closely controlled in any mode of operation. It is therefore essential that the driving and controlling circuitry of the optical disc drive control PCB 13 can adequately control laser power within predefined limits.

In the prior art, control PCBs have been tested by an arrangement utilizing a reference laser, light meter and various other test instruments, the optical disc drive control PCB being used to drive the reference laser while the laser output power and optical disc drive control PCB output to the laser are measured. By varying the optical disc drive control PCB output to the laser, and hence the laser output power, the control PCB output can be characterized and any adjustment made that may be required.

FIG. 2 shows a graphical representation of a typical optical disc drive control PCB output characterization 20. It can be seen that as more drive current 22 (generally expressed in mA) is supplied to the laser, the power output 21 (generally expressed in mW) of the laser will increase. Acceptable upper 25, and lower 24 limits of the ratio 23 of laser power output 21 to drive current 22 are prescribed for each test. By using a reference laser of known performance, the ability of the test PCB to control drive current within the predetermined limits can be judged against a required standard.

Without additional complexity though, this system has the limitation of testing only the open-loop characteristics of the optical disc drive control PCB, so naturally it is essential to also test closed-loop characteristics along with other functions, preferably together with the TVS assembly 11 that the particular control PCB will be matched to at final assembly into the optical disc drive 10. Indeed, this is common practice in the prior art, but other factors now effect the manufacture of optical disc drives as described below:

The above-mentioned sub-modules can, and generally are, manufactured at the same location, but as is increasingly the case in modern manufacturing practice, components and sub-modules may be outsourced or else shipped to different locations/customers if the manufacturer is acting as a first or second tier supplier to an Original Equipment Manufacturer (OEM). In such a situation, sub-modules such as the control PCB 13 cannot be tested together with the TVS mechanism 11 that they will eventually be embodied with into the completed optical disc drive 10, as they would during a single site manufacture and assembly process, because control of the sub-module selection and assembly process is relinquished to the customer.

It has become important then, to develop cost effective and reliable test methods to ensure that sub-modules, and in particular control PCBs, are operable and capable of performing within predetermined ranges when produced according to the above conditions, i.e. isolated from their destination assembly.

FIG. 3 shows a simplified schematic view of a typical optical pick-up head. Light from a laser 301 is collimated into a beam by a lens 302, a proportion of the light is reflected by a polarized plane of a polarizing beam splitter (PBS) 303 onto a photo-detector 304, while the remaining light is reflected by a mirror 307 and focused onto an optical disc 309 by an objective lens 308. Light reflected by the optical disc 309 follows a return path which is the reverse of that stated above, until the light reaches the PBS 303, where returning light is reflected by the polarized plane of the PBS 303, through a lens 305 and onto a photo-detector 306. The photo-detector 304 is dedicated to the task of sensing laser power, and while the primary task of the photo-detector 306 is to read disc information, it can be seen that both photo-detectors sense laser output and hence can be utilized for power detection. So in the prior art then, the means are found to both utilize a laser control drive current or signal, and to measure the laser emissions produced thereby.

SUMMARY OF INVENTION

It is therefore a primary objective of the claimed invention to provide a method for testing control PCBs on a common test device or arrangement of test devices, in order to solve the above problem.

Briefly summarized, the claimed invention provides a method for testing an optical disc drive control PCB using a reference optical pick-up head, the method comprising of a step for measuring an output of the reference optical pick-up head laser in comparison to an output of an optical disc drive control PCB under test and, a step for comparing the measured value to a predetermined value and accordingly determining whether the optical disc drive control PCB under test is acceptable.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
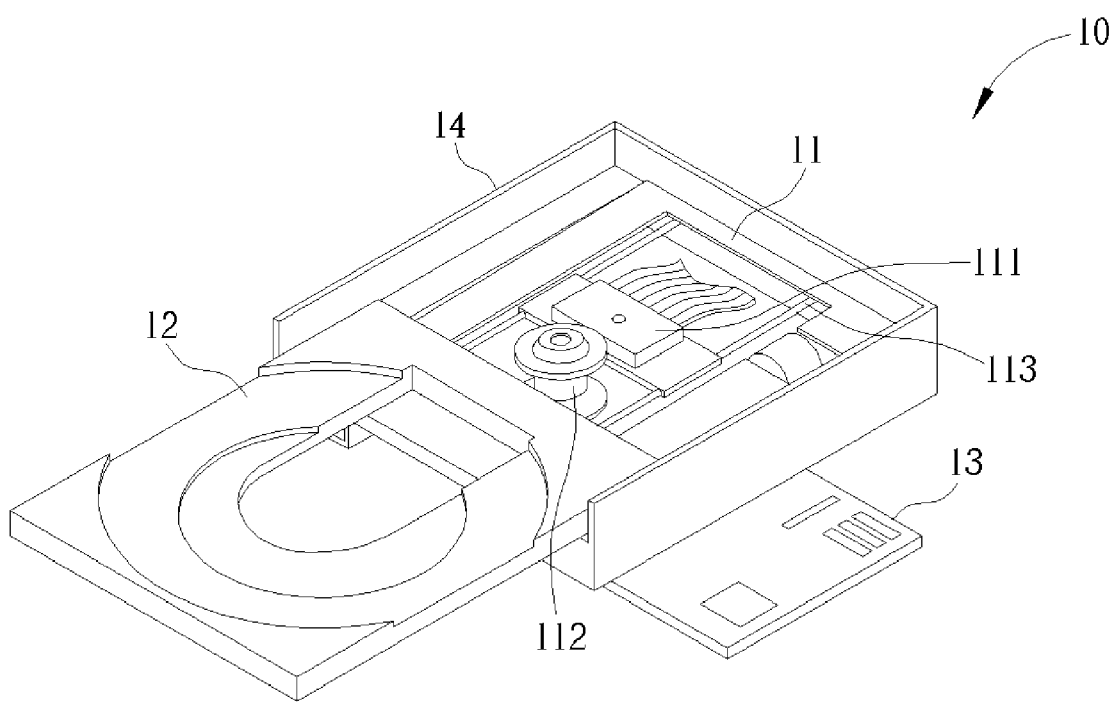
FIG. 1 illustrates sub-modules of a conventional optical disc drive.
Figure 2:
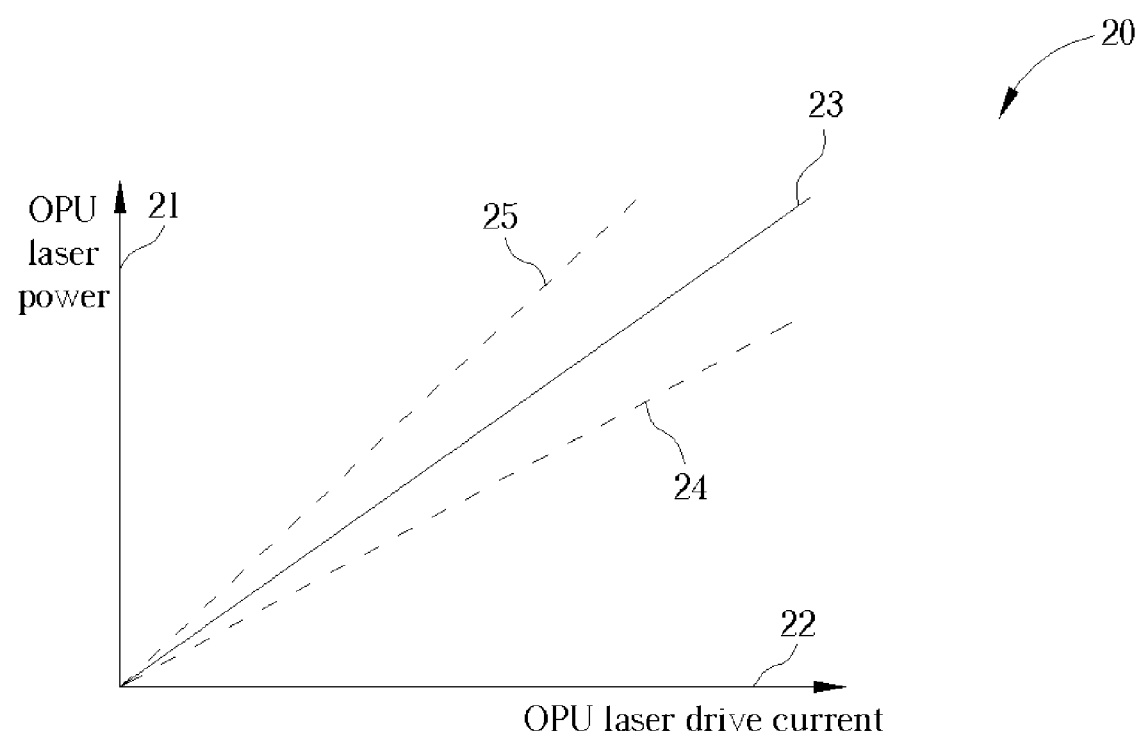
FIG. 2 shows a graphical representation of a typical optical disc drive control PCB output characterization.
Figure 3:
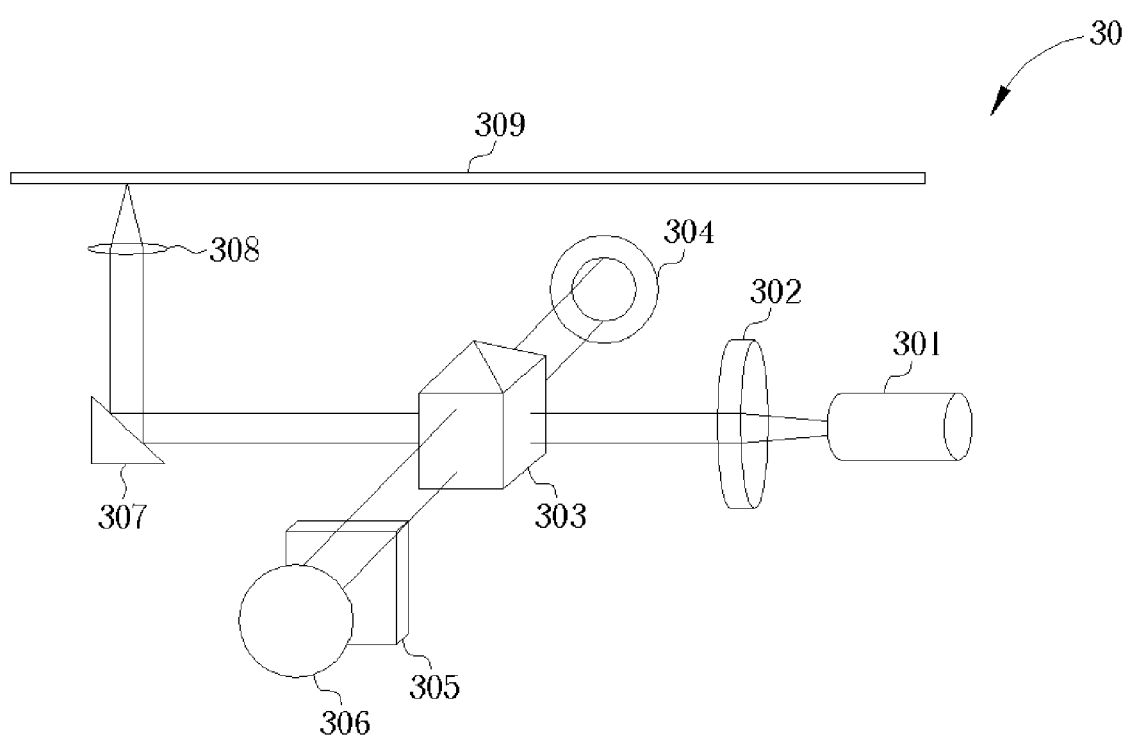
FIG. 3 is a block diagram of a typical optical pick-up head.
Figure 4:
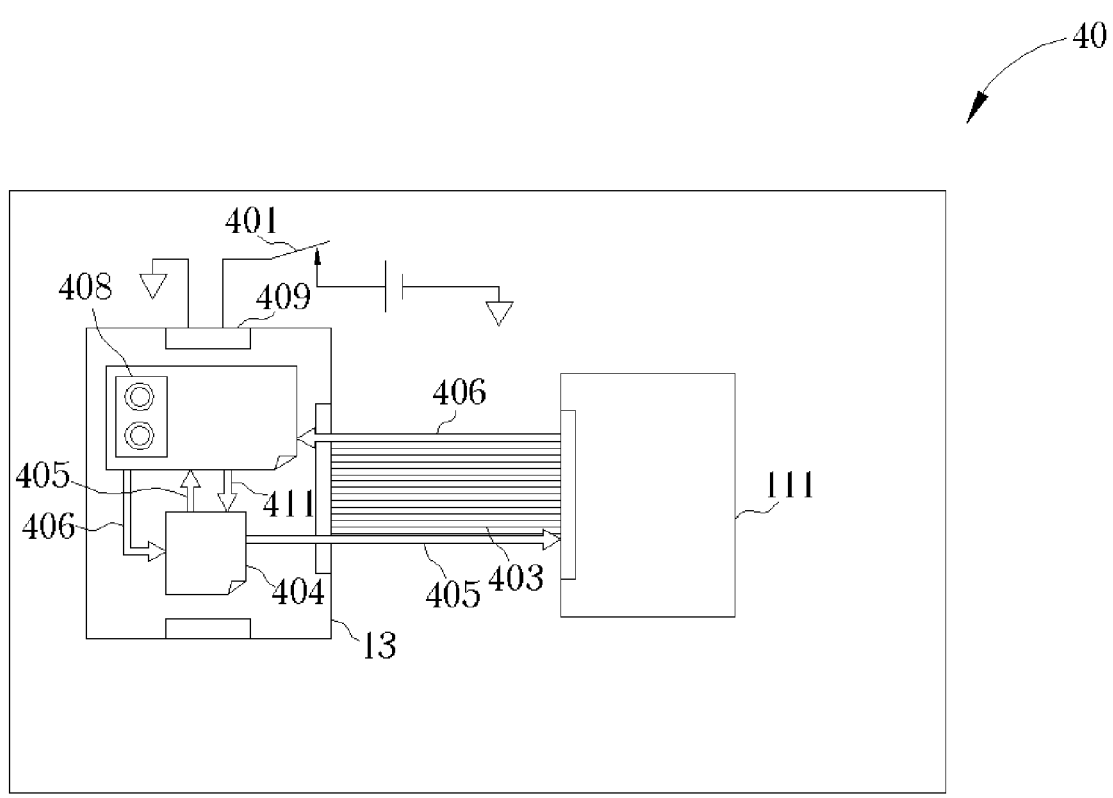
FIG. 4 shows an embodiment of the present invention test system.

FIG. 4 shows an embodiment of the present invention. An optical disc drive control PCB test jig 40, comprising a reference optical pick-up head (OPU) assembly 111 (i.e. an optical pick-up head (OPU) assembly that, regarding those parameters that relate directly to the driving and control of the read/write laser, has known performance), means of at least initiating a test cycle and means of displaying the result(s) of a test cycle, has electrical connections 403 & 409 such that an optical disc drive control PCB 13 requiring test can be readily connected to the jig 40. In the embodiment shown, the optical disc drive control PCB 13 comprises at least a laser control IC 404, and a comparison system 407. The comparison system 407 is an integral part of the optical disc drive control PCB 13 in this embodiment, but may not necessarily be so in alternative embodiments.

In this embodiment, the means of initiating a test cycle is the electrical power connection 409 to the optical disc drive control PCB 13 under test, as the laser control IC 404 commences the laser power test procedure shortly after electrical power is applied. As such, this embodiment also has a power-on/off switch 401. The electrical connections 403 and 409 include socket-plug connectors but may include other types of quick-release connectors that provide quick connection and disconnection of the PCB under test 13, to the reference optical pick-up head assembly 111 and the power-on/off switch 401.

During the test procedure the comparison system 407 monitors a laser control signal 405, that is, the signal created by the optical disc drive control PCB 13 to drive the read/write laser in the optical pick-up head 111, together with a laser power signal 406 returned by the laser power photo-detector 304, or the return path photo-detector 306 as required, of the optical pick-up head 111. The laser control IC 404 automatically initiates a power calibration test each time power is applied in order to make small adjustments to compensate for component degradation over the service life of the optical disc drive 10. However, upon first use, i.e. during testing, the optical disc drive control PCB 13 requires a reference sweep, hence as it increases or decreases the laser control signal 405 in steps over a range representative of the read/write lasers service range, it receives and stores corrections to the laser control signal 405 in the form of a comparison correction signal 411 from the comparison system 407.

The comparison system 407 derives the comparison correction signal 411 by monitoring the laser control signal 405 and the laser power signal 406. With this information the comparison system 407 can characterize the response of the laser control IC 404 and compare said response to predetermined values. In this embodiment, the ratio of the laser control signal 405 to the laser power signal 406 that it represents, is compared to an allowable ratio range stored within the comparison system 407. An alternative embodiment involves the comparison of the laser power signal 406 to values stored in a look-up table within the comparison system 407, the location of the look-up table value being determined by the magnitude of the laser control signal 405.

If, after the final step of the test, the response of the laser control IC 404 is found to be satisfactory, the comparison system 407 will give a 'pass' indication, or if the opposite case is true, a 'fail' indication. The comparison system 407 displays the above-mentioned indications via an enunciator; in this embodiment the comparison system 407 hosts a pair of LEDs 408, one red LED as a 'fail' indicator and one green LED as a 'pass' indicator. An alternative embodiment includes only a single element enunciator arranged as a pass indication, with no indication implying a fail, or vice-versa. Further alternative embodiments include using the following elements as pass, fail or status indicators: single or multiple multi-colored LEDs, filament lamps or audible sounder. More sophisticated embodiments may also utilize an LCD display.

Figure 5:
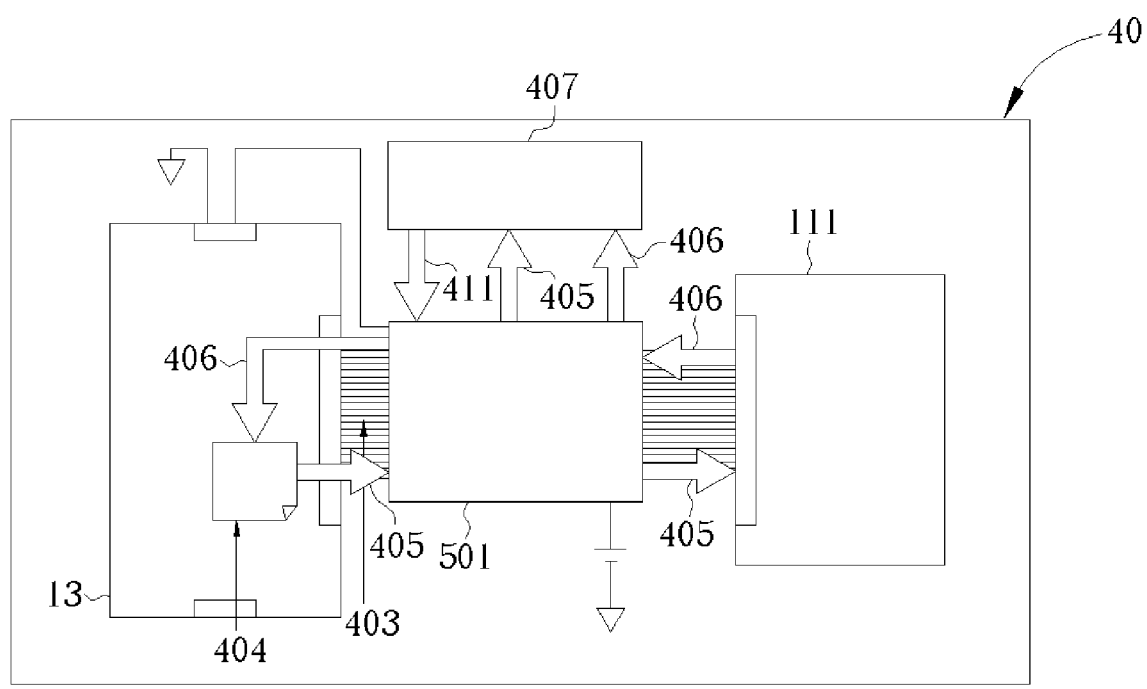
FIG. 5 shows an embodiment of the present invention test system.

FIG. 5 shows an embodiment of the present invention where, as eluded to above, the comparison system 407 is mounted on the optical disc drive control PCB test jig 40. This arrangement requires a higher degree of sophistication of the optical disc drive control PCB test jig 40, and accordingly a test interface 501 and an electrical interconnection 502 are included to allow the comparison system 407 to monitor relevant signals traveling to and from the optical pick-up head 111 and send the comparison error signal 411 to the laser control IC 404. The test procedure, in so far as it involves the laser control IC 404 and the pick-up head 111, operates in the same way as the above-mentioned embodiments. Again similar to the embodiment mentioned above, the comparison system 407 displays pass/fail indications via an enunciator, although for embodiments in which the sophistication of the comparison system 407 and/or the test interface 501, a status output of either element may be enhanced to include not only a simple visual pass/fail indication but also, for example, a graphical characterization of the test parameters. In the latter case, the graphical characterization would require a more capable display device than a simple enunciator. Options would include an LCD display, a CRT display, a chart recorder, a plotter, a PC or printer.

Figure 6:
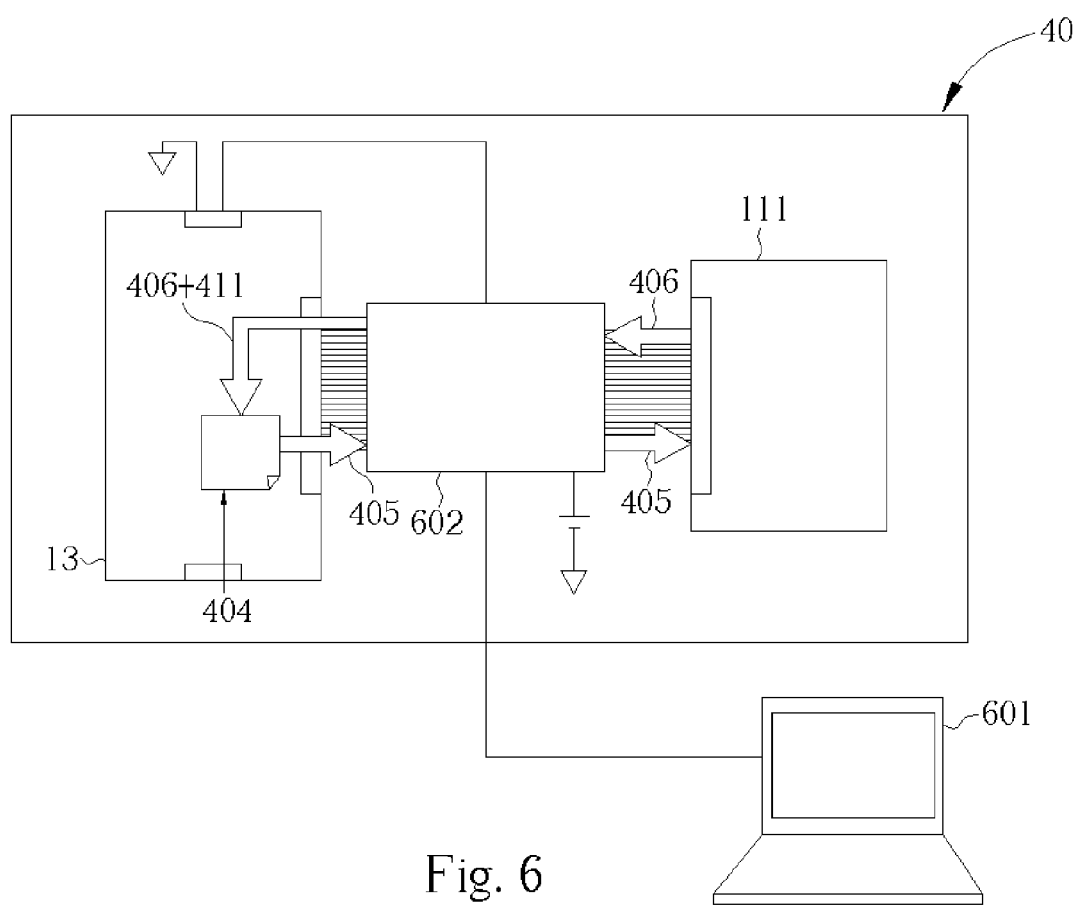
FIG. 6 shows an embodiment of the present invention test system.

FIG. 6 shows an embodiment of the present invention where the functions of the comparison system 407, test interface 501 and test status indications are perform by a PC 601 via a PC test interface 602. Again, the test procedure, in so far as it involves the laser control IC 404 and the pick-up head 111, operates in the same way as the above-mentioned embodiments. This embodiment offers the capability to emulate any of the above mentioned test status indicators, it also provides test data recording, archiving facilities and automatic retesting, however, embodiments utilizing less sophisticated software interfaces would offer fewer functions.

Figure 7:
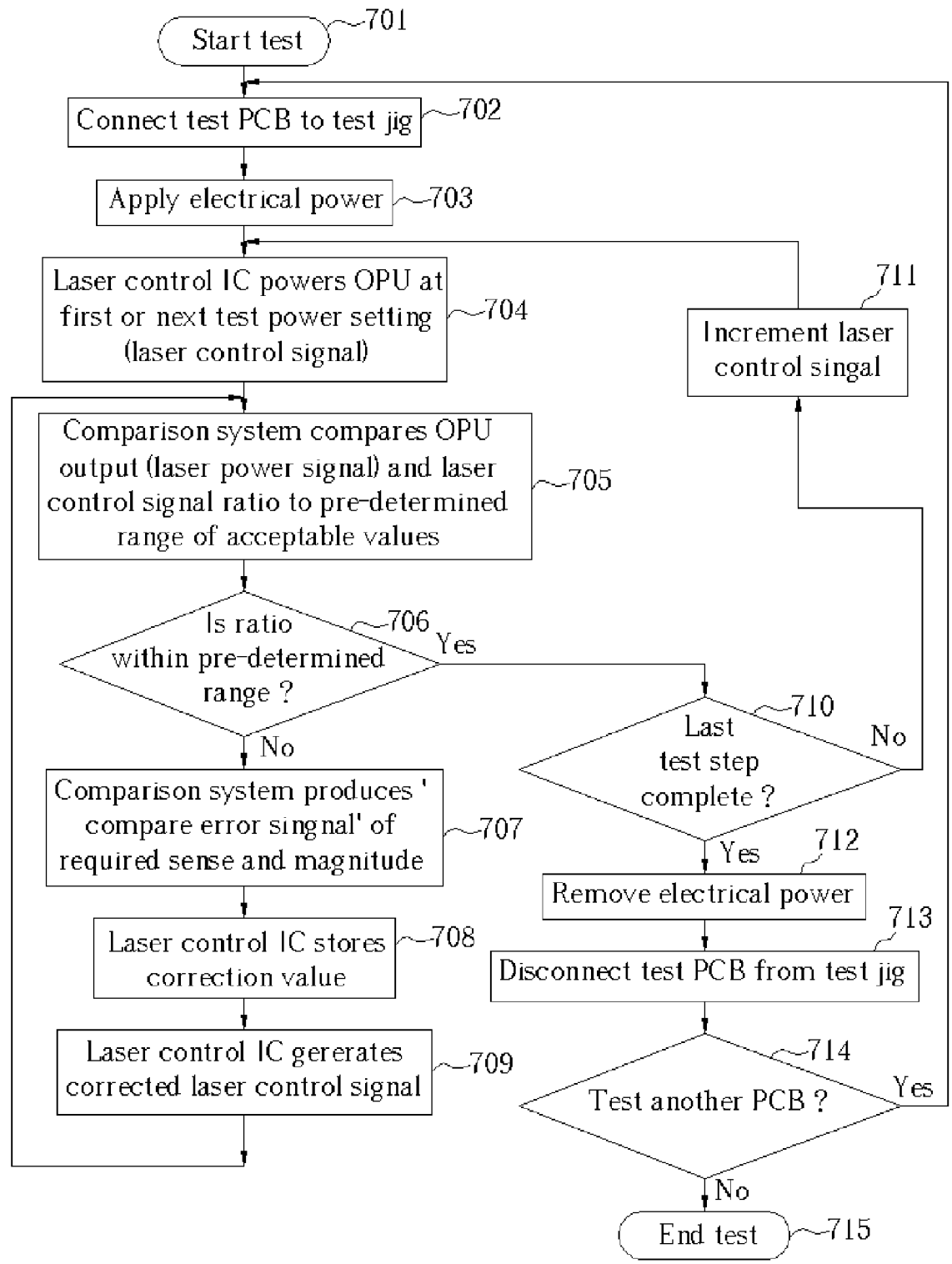
FIG. 7 is a flow diagram of the process of the present invention.

FIG. 7 is a flow diagram of the test process common to all embodiments of the present invention. A more detailed explanation of the steps involved follows:

Step 701: Commence testing of PCB(s) 13;

Step 702: Test PCB 13 secured to test jig 40, electrical connections to power supply, OPU 111 or interface 501/602 made as necessary;

Step 703: Electrical power applied;

Step 704: The laser control IC 404 will automatically initiate a power calibration test sequence, generally ramping or stepping up laser drive current beginning with a lowest power setting, or increment/increase the laser drive current (laser control signal 405) depending upon previous steps, i.e. the output of step 711;

Step 705: The comparison system 407 compares the ratio 23 of laser power output 21 (laser power signal 406) to laser drive current 22 (laser control signal 405) to predetermined upper 25 and lower 24 limits;

Step 706: The comparison system 407 makes a judgment on whether or not the ratio 23 of step 705 complies to the predetermined standard;

Step 707: In the event that the value of the ratio 23 of step 705 falls outside the predetermined limits 24 & 25, the comparison system 407 produces and sends a compare error signal 411 to the laser control IC 404. The compare error signal 411 is a correction to be applied to the laser control signal 405;

Step 708: The laser control IC 404 stores the value of the compare error signal 411;

Step 709: The laser control IC 404 adjusts the laser control signal 405 according to the value of the compare error signal 411 and a process beginning with step 705 is repeated;

Step 710: In the event that the value of the ratio 23 of step 705 falls within the predetermined limits 24 & 25, the test is progressed to the next stage via step 711, else terminated via steps 712, 713 & 714;

Step 711: The laser control IC 404 increments/increases or decrements/decreases the laser control signal 405 as appropriate;

Step 712: Electrical power removed;

Step 713: Test PCB 13 electrically disconnected and removed from test jig 40;

Step 714: If another PCB 13 is to be tested then process from step 702 onward may be repeated;

Step 715: Cease testing.

It should be noted that some steps of the above method can be performed by human operators or by machines on a manufacturing line. For instance, in step 702, the test PCB 13 can be manually secured to test jig 40. On higher volume production lines the test PCB 13 can be secured to test jig 40 as part of the manufacturing-testing process. Another example is the electrical power application and removal steps 703, 712. A human operator can simply toggle a power switch, or power can be applied automatically by an assembly line component. Furthermore, the order of the steps can be changed, additional steps can intervene, or steps can be removed, depending on the specific implementation.

Those skilled in the art will readily observe that numerous modification and alternation of the device may be made while retaining the teaching of the invention. Accordingly, the above disclosure should be construed as limited only by the metes and bounds of the appended claims.

What is claimed is:

1. A method for testing an optical disc drive control PCB using a reference optical pick-up head, the method comprising:
   a step for determining a value by comparing an output of an optical disc drive control PCB under test to an output of a reference optical pick-up head laser;
   a step for comparing the value to a pre-determined value and accordingly determining whether the optical disc drive control PCB under test is acceptable;
   a step for connecting the optical disc drive control PCB under test to the reference optical pick-up head; and
   a step for disconnecting the optical disc drive control PCB under test form the reference optical pick-up head when the test is complete.

2. The method of claim 1, further comprising a step for adjusting the output of the optical disc drive control PCB.

3. The method of claim 1, wherein the output of the reference optical pick-up head is from light emitted to a surface or an optical disc then reflected back to the optical pick-up head.

4. The method of claim 1, further comprising generating a pass/fail indication accordingly to the determination of acceptability of the optical disc drive control PCB under test.

5. The method of claim 1, further comprising generating a graphical characterization of the comparison of the measured value to the predetermined value.

6. The method of claim 1, wherein all steps are repeated for a batch of optical disc drive control PCBs under test.

7. A method for testing an optical disc drive control PCB using a reference optical pick-up head, the method comprising:
   connecting the optical disc drive control PCB under test to the reference optical pick-up head;
   determining a value by comparing an output of an optical disc drive control PCB under test to an output of a reference optical pick-up head laser;
   comparing the value to a predetermined value and accordingly determining whether the optical disc drive control PCB under test is acceptable; and
   disconnecting the optical disc drive control PCB under test from the reference optical pick-up head.

8. The method of claim 7, further comprising a step for adjusting the output of the optical disc drive control PCB.

9. The method of claim 7, wherein the output of the reference optical pick-up head laser is measured using light emitted to a surface of an optical disc then reflected back to the reference optical pick-up head, or from light emitted by the laser directly via a polarizing beam splitter (PBS) of the reference optical pick-up head.

10. The method of claim 7, further comprising generating a pass/fail indication accordingly to the determination of acceptability of the optical disc drive control PCB under test.

11. The method of claim 7, further comprising generating a graphical characterization of the comparison of the measured value to the predetermined value.

12. The method of claim 7, wherein all steps are repeated for a batch of optical disc drive control PCBs under test.

13. An optical disc drive control PCB test assembly comprising:
   a pick-up head for emitting and receiving laser light;
   means for laser power monitoring;
   means for presenting guiding instructions to assist in the optical disc drive control PCB under test; and
   means for electrically connecting an optical disc drive control PCB to the optical disc drive control PCB test assembly, wherein the optical disc drive control PCB test assembly may readily be used in the consecutive testing of a plurality of optical disc drive control PCBs.

14. The device of claim 13, wherein the test assembly further comprises a means of presenting a pass/fail indication.

15. The device of claim 13, wherein the test assembly further comprising a means of presenting guiding instructions to assist in the adjustment of the optical disc drive control PCB under test.

* * * * *